United States Patent [19]

Papez

[11] 4,290,319

[45] Sep. 22, 1981

[54] DEVICE FOR THE BALANCING OF INERTIA FORCES OF RECIPROCATING PISTON-CRANKSHAFT ENGINES

[75] Inventor: Stanislav Papez, Wolfsburg, Fed. Rep. of Germany

[73] Assignee: Volkswagenwerk Aktiengesellschaft, Wolfsburg, Fed. Rep. of Germany

[21] Appl. No.: 51,760

[22] Filed: Jun. 25, 1979

[30] Foreign Application Priority Data

Jul. 1, 1978 [DE] Fed. Rep. of Germany ....... 2829042

[51] Int. Cl.³ ............................................. F16F 15/26
[52] U.S. Cl. ........................................................ 74/604
[58] Field of Search ................................... 74/603, 604

[56] References Cited

U.S. PATENT DOCUMENTS

| | | |
|---|---|---|
| 1,488,640 | 4/1924 | Holden . |
| 1,756,915 | 4/1930 | Short ................................. 74/604 |
| 2,280,384 | 4/1942 | Dickson . |
| 2,304,892 | 12/1942 | Dickson . |
| 2,432,907 | 12/1947 | Langer .......................... 74/604 X |
| 2,566,476 | 9/1951 | Zuhn ................................. 74/604 |
| 3,110,195 | 11/1963 | Hanley ............................. 74/604 |
| 3,203,374 | 8/1965 | Barth et al. . |
| 3,401,579 | 9/1968 | Derrig ............................. 74/604 |
| 3,415,237 | 10/1968 | Harkness . |
| 3,800,625 | 4/1974 | Seino et al. ...................... 74/604 |
| 3,995,610 | 12/1976 | Nakamura et al. . |
| 4,000,666 | 1/1977 | Ito et al. .......................... 74/604 |
| 4,074,589 | 2/1978 | Nakamura et al. ............... 74/604 |

FOREIGN PATENT DOCUMENTS

| | | | |
|---|---|---|---|
| 274476 | 9/1969 | Austria . | |
| 1188365 | 3/1965 | Fed. Rep. of Germany ........ 74/603 |
| 1935121 | 1/1971 | Fed. Rep. of Germany . | |
| 2558618 | 7/1976 | Fed. Rep. of Germany . | |
| 676015 | 7/1952 | United Kingdom . | |
| 684101 | 12/1952 | United Kingdom .................. 74/603 |

*Primary Examiner*—Thomas F. Callaghan
*Attorney, Agent, or Firm*—Brumbaugh, Graves, Donohue & Raymond

[57] ABSTRACT

This invention is an apparatus for partial balancing of the free inertia forces and inertia moments of a reciprocating piston-crankshaft engine which is comprised of a pair of eccentrically weighted balancing masses mounted on an axial end of the engine. The balancing masses are mounted on drive pulleys which can be driven in opposite directions by a toothed-belt with teeth on both sides which is connected to the crankshaft. The balancing masses are arranged so that their centrifugal force components extending parallel to the cylinder axes are added and the centrifugal force components extending perpendicular to the cylinder axes cancel each other out and the axes of rotation of the pulleys are offset relative to each other in the direction of the cylinder axes. The described above can be very effectively utilized by mounting the drive pulleys of the balancing masses on a plate which is mounted for rotation on an axis extending parallel to the crankshaft axis and by providing a means for tensioning the toothed belt. There may be provided a drive for pivoting the plate upon which the drive pulleys are mounted which plate can be pivoted as a function of the speed and/or load of the reciprocating piston-crankshaft engine.

6 Claims, 3 Drawing Figures

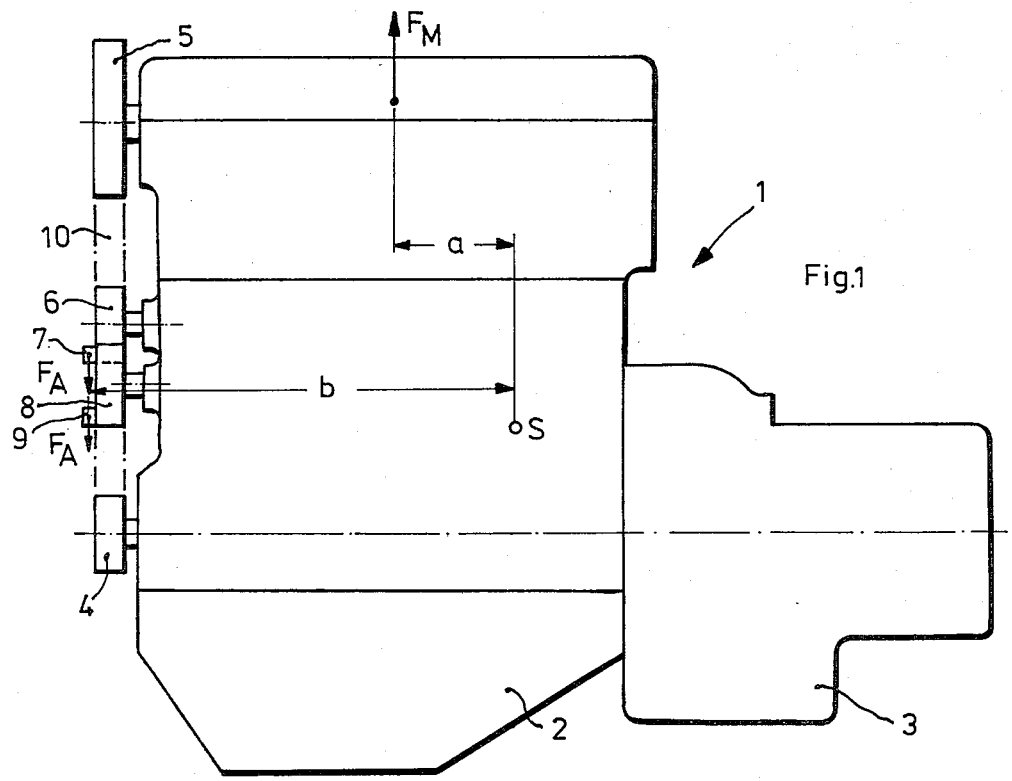
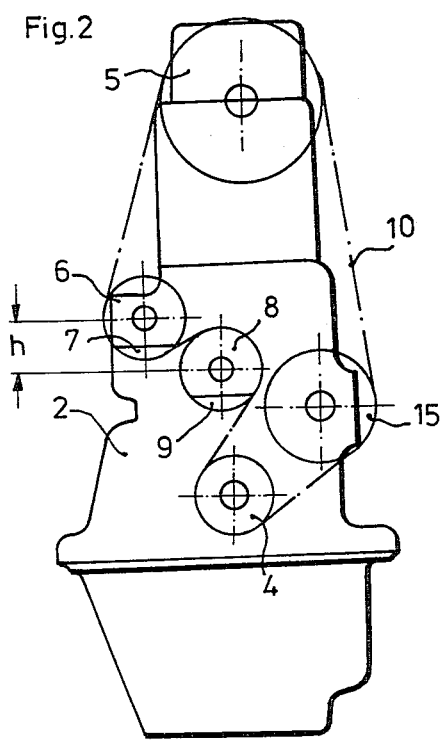
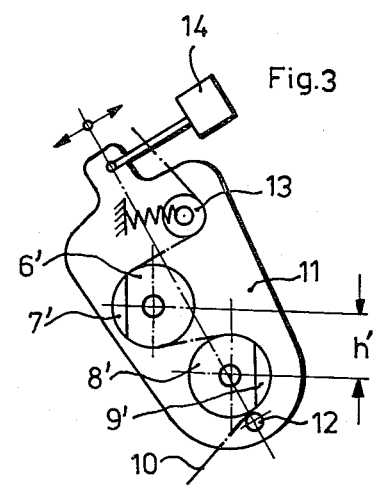

DEVICE FOR THE BALANCING OF INERTIA FORCES OF RECIPROCATING PISTON-CRANKSHAFT ENGINES

BACKGROUND OF THE INVENTION

This invention relates to apparatus for partial balancing of the free inertia forces and inertia moments of reciprocating piston-crankshaft engines, particularly inertia forces of the second order in four-cylinder, four-stroke in-line engines and for partial balancing of the free inertia moments of three- and five-cylinder, four-stroke in-line engines.

The existence of inertial forces in reciprocating piston engines is well known. These forces arise from the reciprocating motion of engine components, such as pistons and connecting rods. Most reciprocating piston engines make use of rotating counterweights arranged on the crankshaft for balancing the first order inertial forces occurring in the longitudinal direction of the cylinder. Second order forces can be balanced by use of an arrangement known as the Lanchester equalizer, which makes use of a pair of auxiliary shafts provided with counterweights and connected to the crankshaft by a transmission which causes the auxiliary shafts to rotate at double the crankshaft speed in opposite directions. The Lanchester equalizer arrangement necessitates a comparatively extensive structural arrangement, and therefore significantly increases the cost of the engine. Furthermore, considerable noise arises due to the high revolution speed of the auxiliary shafts and their drives. Another disadvantage of the arrangement is that the auxiliary shaft must be designed into the engine prior to engine design and construction, and subsequent installation of the auxiliary shafts on a reciprocating engine cannot be practically implemented.

In addition to the inertial forces occurring in the longitudinal cylinder direction, which arise from piston throw, there are transverse forces which act on the engine in a direction transverse to the cylinder axes and arise out of the pivoting motion of the connecting rods. These "slideway" forces are the transverse components of the inertial and gas forces acting on the connecting rods due to the swiveling motion of the connecting rods during crankshaft rotation. The transverse forces are second order forces, since they act with cyclical regularity at twice the revolution frequency of the crankshaft.

It is therefore an object of the present invention to provide an apparatus for partial balancing of inertial forces in a reciprocating piston-crankshaft engine.

It is a further object of the invention to provide such an arrangement which may be inexpensively implemented, and which can be adapted to an existing reciprocating engine.

It is a still further object of the invention to provide such an apparatus which compensates for transverse forces as well as longitudinal first and second order inertial forces.

SUMMARY OF INVENTION

In accordance with the invention, a reciprocating piston engine is provided with an apparatus for partial balancing of the first and second or higher order free-force inertia forces and inertial moments generated in the engine. The apparatus includes a pair of eccentrically weighted balancing masses mounted on one axial end of the engine. There is provided a transmission means for connecting the balancing masses to the crankshaft for rotating the masses in opposite directions at a velocity two or more times the crankshaft speed.

In a preferred embodiment the transmission means consists of a drive pulley on each of the balancing masses and a toothed belt provided with teeth on either side, which is connected to the crankshaft and the pulleys so as to drive the pulleys in opposite directions. The balancing masses can be arranged such that their centrifugal force components reinforce in a direction parallel to the cylinder axes and cancel in a direction perpendicular to the cylinder axes. The axes of rotation of the drive pulleys of the balancing masses may be offset relative to each other in the direction of the cylinder axes.

The apparatus of the invention is particularly useful in a configuration wherein the balancing masses are supported on a plate, which is mounted for rotation on an axis extending parallel to the crankshaft axis, and wherein there is provided means for tensioning the toothed belt. A drive element may be provided for pivoting the plate as a function of the speed and/or load of the engine.

The apparatus of the invention provides a partial compensation of inertia forces extending essentially in the longitudinal direction of the cylinder, and can also provide compensation of the free inertia moments transverse to the cylinder axis without generating additional transverse forces. The axes of rotation of the pulleys are offset relative to each other in the direction of the cylinder axis so that the components of the centrifugal forces acting perpendicular to the cylinder axis and directed opposite each other possess a lever arm for the formation of a counter moment. When the pulleys are mounted on the plate described in one configuration of the invention, the lever arm just described as existing between the two centrifugal force components acting perpendicular to the cylinder axes can be adjusted by changing the angle of the plate in order to vary the magnitude of the balancing moment. This feature is optimized by providing a drive for pivoting the plate as a function of the operating condition, for example, the speed and/or load of the engine. Perhaps the greatest advantage of the balancing apparatus in accordance with the invention is that it requires no major structural changes in the engine and can be installed on existing engines. Even though the compensation of the inertia forces is not always complete, it does decisively improve the vibration and noise characteristics which is particularly important for internal combustion engines of passenger cars.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1 is a side view of an engine having a balancing apparatus in accordance with the present invention FIG. 2 is a front view of the FIG. 1 engine FIG. 3 is an illustration of another embodiment of the invention.

DESCRIPTION OF THE INVENTION

Referring generally to FIGS. 1 and 2, there is shown a drive unit 1 which consists of a four cylinder, four-stroke, in-line engine 2 and its associated transmission 3. The engine includes pistons which move in cylinders having parallel vertical axes. The pistons are connected to a crankshaft, on the forward end of which there is mounted a toothed gear 4, which is connected to a camshaft driving gear 5 by a toothed belt 10. In addition to the crankshaft gear 4 and the camshaft gear 5, the toothed belt is also provided with a guide gear 15 and also possibly a device for tensioning the belt. In accordance with the invention, there is provided a balancing apparatus on the forward axial end of the engine 2. The balancing apparatus consists of balancing masses 7 and 9 which are eccentrically located on the drive pulleys 6 and 8, which have toothed gears and are driven in opposite directions by the toothed belt 10 at twice the rotational speed of crankshaft gear 4. The balancing masses 7 and 9 are arranged on the drive pulleys 6 and 8 in such a manner that their centrifugal force components extending parallel to the cylinder axes are added and their centrifugal force components extending perpendicular to the cylinder axes cancel each other out. This effect is achieved by the relative angular orientation of the masses illustrated in the drawing wherein each of balancing masses 7 and 9 are shown perpendicularly below its respective axis of rotation. This orientation causes their centrifugal forced to act in the same downward direction. On further rotation by 90°, the centrifugal forces act in opposite directions. After a further 90° rotation, each of the balancing masses is at a position perpendicularly above its respective axis of rotation, and the centrifugal forces add in an upward direction.

The resulting imbalance of forces obtained in the above arrangement acts in the longitudinal direction of the cylinder as shown in FIG. 1 by $F_A$, and are used for compensation of the free second order inertia forces and moments generated during operation of the reciprocating piston-crankshaft engine. The free inertia forces of the second order generated in a four-cylinder, four-stroke, in-line engine, which act in a longitudinal cylinder direction are represented in FIG. 1 by $F_M$. These free inertia forces which oscillate at double the crankshaft speed cannot be compensated by counterweights on the connecting rods but can be compensated by means of the balancing device which, consequently, must be driven at twice the rotational velocity of the crankshaft.

The balancing device shown in the drawings is fastened on one axial end face of the engine-transmission to facilitate easier installation subsequent to engine design and/or construction. This configuration prevents locating the non-balanced inertia forces at a point which would completely balance both the second order inertia forces and moments exerted by such forces around the aggregated center of gravity S simultaneously. Conditions are improved, however, by providing the other end face with such a mass balancing device which could also be driven at twice the rotational velocity of the crankshaft. This configuration is not shown in the drawings, but such extension is within the spirit of the invention as shown and described herein.

It should be noted in FIG. 1, that the compensating force $F_A$ of the balancing mass is arranged at a distance b from the drive unit center of mass S. Since the second order inertial forces $F_M$ act at a distance a from the drive unit center of mass, there will be also created a free moment around the center of mass, which is main cause of vibrations and noises in the engine. In order to balance this free moment the magnitude of the balancing force $F_A$ can be smaller than the resultant second order force $F_M$ by the ratio of a to b because of the different distances of the working points of the forces $F_A$ and $F_M$, respectively, from the center of mass. But it is noted that with a thus reduced balancing force $F_A$ a complete compensation for the inertial force $F_M$ cannot be effected. It is only possible to partially balance the resultant inertial second order force $F_M$ and to completely balance the moment around the center of gravity S, or vice versa. The uncompensated second order force $F_M$-$F_A$ then continues to act on the engine at the center of mass. But also in partially balancing these forces and moments, there can be a considerable reduction in undesirable noise and vibration in the piston crankshaft engine.

The axes of the drive pulleys 6 and 8 are shown in FIG. 2 as offset relative to each other in the transverse cylinder direction. This configuration creates a moment arm h upon which the centrifugal force component acting perpendicular to the cylinder axes act resulting in a moment about an axis parallel to the crankshaft axis. The drive pulleys 6 and 8 can be located to render a clockwise or a counterclockwise moment that can be used to compensate second order moments around the crankshaft as a result of forces which are directed across the cylinder axis. These forces are sliding path forces caused by mass and gas forces acting on the connecting rods. The sliding path forces originated by the mass forces act in a direction precisely opposite that of the gas forces producing opposing moments around the crankshaft. The drive pulleys 6 and 8 of the balancing masses 7 and 9 can be arranged so as to compensate for the predominant moment created by the mass and gas forces.

Additional moment stresses around a main inertia axis of the total drive unit may result from the arrangement of the drive unit, its weight distribution and the manner of torque pick-up. These conditions may vary greatly depending on whether the engine is installed longitudinally or transversely and on whether the transmission is flange-mounted on the engine or is supported separately, e.g. in the rear of the vehicle. The moments resulting from the above configurations and various conditions can also be compensated by means of the mass balancing device in accordance with the invention.

A refined embodiment of the invention is shown at FIG. 3, wherein the drive pulleys 6' and 8' with balancing mass 7' and 9' are affixed to a plate 11 supported on the end face of engine 2 by axis 12 extending parallel to the crankshaft axis. The plate is provided with a drive 14 which adjusts the position of plate 11 depending on the load and/or speed of the crankshaft. The drive may be a conventional control motor adjustable, e.g., electrically, pneumatically, or hydraulically. In an embodiment comprising a pneumatic control motor, the vacuum pressure prevailing in the intake manifold of a spark-ignited internal combustion engine may be used as a measure of engine load and, accordingly, determine the adjustment of the pivoting plate 11. Instead of a drive 14, the plate could be also adjusted to various angular positions by means of screws (not shown). As the plate 11 is changed to different positions, the lever arm h' is varied to change torques produced thereby to adjust to the free torques around the crankshaft generated in the drive unit. In order to insure compensation of the length of the toothed belt 10 as the plate 11 is displaced a tensioning device 13 is provided. A variation of the embodiment of the invention would be to exclude the drive 14 and to merely provide for the possibility of angular displacement of the plate 11 in order to compensate for defined torques. Also, as previously suggested, it is entirely feasible to provide an arrangement of this embodiment on the other end face of the engine 2 in order to gain more effective balancing.

As set forth above, the mass balancing device in accordance with the invention is not limited to four-cylinder, four-stroke, in-line engines. The device could also be very effectively used to compensate free first, second or higher order inertia moments around the center of gravity and free moments about the crankshaft axis in three- and five-cylinder four-stroke in-line engines.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. Apparatus for partial balancing of the free Nth order inertia forces and inertia moments of a reciprocating piston engine having a crankshaft, where N is an integer, comprising a pair of eccentrically weighted balancing masses, mounted on an axial end of said engine for rotation in a plane perpendicular to the crankshaft axis, and transmission means for connecting said balancing masses to said crankshaft and causing said masses to rotate in opposite directions at a rotational speed N times the speed of said crankshaft.

2. Apparatus as specified in claim 1, wherein said transmission means includes a drive pulley on each of said balancing masses and a toothed belt provided with teeth on two sides, said belt engaging said crankshaft and opposite sides of said belt engaging said pulleys to rotate said balancing masses in opposite directions.

3. Apparatus as specified in claim 2, for use in an engine having pistons arranged to reciprocate along parallel axes, wherein said balancing masses are rotationally oriented to cause their respective centrifugal force components to reinforce in a direction parallel to said cylinder axes and cancel in a direction perpendicular to said cylinder axes.

4. Apparatus as specified in claim 3, wherein said pulleys have axes of rotation which are offset relative to each other in the direction of the cylinder axes.

5. Apparatus as specified in claim 4, wherein said drive pulleys are supported on a plate which is mounted for rotation on an axis extending parallel to the crankshaft axis, and wherein there is provided means on said plate for tensioning of said toothed belt.

6. Apparatus as recited in claim 5, wherein there is provided a drive for pivoting said plate as a function of the operating condition of said engine.

* * * * *